3,354,215
ARYLAMMONIUM PHOSPHONATES AND
PREPARATION THEREOF
Albert Y. Garner, Yellow Springs, Ohio, assignor to Monsanto Research Corporation, St. Louis, Mo., a corporation of Delaware
No Drawing. Filed Sept. 28, 1964, Ser. No. 399,844
6 Claims. (Cl. 260—579)

ABSTRACT OF THE DISCLOSURE

Compounds, which are arylammonium phosphonates, are prepared by heating a mixture of a dialkyl phosphonate, an aromatic amine, and water.

---

The present invention relates to phosphorus-containing ammonium compounds and more particularly provides a new and valuable class of substituted ammonium phosphonates and the method of preparing the same.

The presently provided compounds have the formula

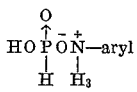

wherein aryl denotes a hydrocarbon benzenoid radical linked to the nitrogen through nuclear carbon, free of olefinic and acetylenic unsaturation and containing from 6 to 12 carbon atoms. The compounds, which are arylammonium phosphonates, are prepared by heating a mixture of a dialkyl phosphonate, an aromatic amine, and water, the reaction proceeding substantially as follows:

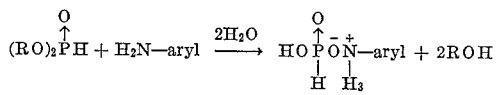

wherein R is an alkyl radical of from 1 to 5 carbon atoms and aryl is as defined above.

Examples of useful dialkyl phosphonates include the simple and mixed diesters such as dimethyl, diethyl, diisopropyl, di-n-butyl, dipentyl, methyl propyl, ethyl isobutyl and methyl pentyl phosphonates. The useful arylamines include aniline, o-, m- and p-toluidine, o-, m- and p-butylaniline, o-, m- and p-hexylaniline, α- and β-naphthylamine, o-, m- and p-biphenylamine, etc.

Arylammonium phosphonates which are obtained according to the invention are, for example, phenylammonium phosphonate, o-, m- and p-tolylammonium phosphonate, (2,4,6-triethylphenyl)ammonium phosphonate, (hexamethylphenyl)ammonium phosphonate, (p-cyclohexylphenyl)ammonium phosphonate, (α-methyl-β-naphthyl)ammonium phosphonate, p-biphenylylammonium phosphonate, etc.

Reaction of the arylamine with the dialkyl phosphonate and water takes place by simply heating at, say, 50° C. to 125° C., a mixture of the three reactants until formation of the arylammonium phosphonate. Refluxing temperatures are advantageously employed. The reaction takes place in the absence of a catalyst, but a weak inorganic base, say, potassium carbonate or lithium acetate may be used to accelerate the hydrolysis of the phosphonate ester groups during the reaction. Inert, organic liquid diluents or solvents may or may not be used, although the use of a solvent, e.g., benzene, xylene, acetone or hexane is advantageous when the arylamine reactant is a solid. When the amine is liquid at normal temperatures or liquefies under the operating conditions, an excess of water conveniently serves as diluent. Inasmuch as formation of the presently provided arylammonium phosphonates involves reaction of one mole of the diethyl phosphonate with one mole of the arylamine and two moles of water, these reactants should be present in at least such stoichiometric proportions; however, an excess of either the water or of the dialkyl phosphonate may be used to serve as diluent. The arylammonium phosphonates are readily separated from excess reactant or extraneous diluent, if one is used, by isolating procedures customarily employed by those skilled in the art, e.g., by volatilizing off, under vacuum if necessary, the other components of the final reaction mixture, by solvent extraction, precipitation, volatilization of impurities, etc. Conveniently, in the present instance, when water is used as diluent and the dialkyl phosphonate and the arylamine are present in equimolar proportions with respect to each other, the water is volatilized off gradually while heating to effect reaction, and the product thus obtained is a slightly crude arylammonium phosphonate which can be readily purified by washing with a non-solvent. Subsequent purification can be effected, e.g., by recrystallization from a mixture of solvent and non-solvent.

The presently provided arylammonium phosphonates are stable, well-characterized compounds which are generally crystalline solids. They usually dissolve in water and the lower alkanols to give solutions wherein the dissolved arylammonium phosphonate is stable even after heating for long periods. The compounds are generally insoluble in ether, acetone and methylene chloride. The arylammonium phosphonates are advantageously employed in a variety of agricultural and industrial fields; however, they are particularly useful as rust-inhibiting additives to aqueous systems in cooling and heating applications, e.g., radiator coolants, boiler fluids, etc.

The invention is further illustrated by, but not limited to, the following example.

Example 1

A mixture consisting of 20.0 g. (0.2 mole) of aniline, 30 ml. (0.2 mole) of diethyl phosphonate and 20 ml. of water was heated on the steam bath for 16 hours and then allowed to stand overnight at room temperature. The thick oil which had been formed at first had solidified upon standing. It was washed well with ether, in which it was insoluble. Addition of methylene chloride to the washed product resulted in a suspension of crystals in a deep, purple liquid. The crystals were filtered off and recrystallized first from a mixture of dioxane and methanol and then from a mixture of acetone and water to give the gray-white, substantially pure phenylammonium phosphonate, M.P. 179.5–180.8° C., and analyzing as follows:

Calc'd. for $C_6H_{10}NO_3P$, percent: C, 41.15; H, 5.71; N, 8.00; P, 17.72. Found, percent: C, 41.19; H, 5.85; N, 7.83; P, 17.95.

$P^{31}$ nuclear magnetic resonance analysis was consistent with the structure, chemical shifts being obtained at −21.8 p.p.m. and 16.9 p.p.m., with a center of gravity at −4.9 p.p.m.

Operating as above, other esters may replace the diethyl phosphonate, e.g., there may be used the dimethyl, the butyl ethyl or the dipentyl phosphonate. Likewise, the aniline used above may be replaced by another arylamine, e.g., p-toluidine or p-biphenylamine to give p-tolylammonium or p-biphenylylammonium phosphonate.

Obviously, many modifications and variations of the present invention as hereinbefore set forth may be made without departing from the spirit and scope thereof, and therefore only such limitations should be imposed as are indicated in the appended claims.

What I claim is:
1. The arylammonium phosphonate of the formula

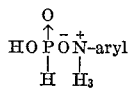

wherein aryl denotes a hydrocarbon benzenoid radical linked to the nitrogen through nuclear carbon, free of olefinic and acetylenic unsaturation, and containing from 6 to 12 carbon atoms.

2. Phenylammonium phosphonate.

3. The method which comprises heating a mixture of (1) a dialkyl phosphonate of the formula $$(RO)_2\overset{\overset{O}{\uparrow}}{P}H$$

wherein R is an alkyl radical of from 1 to 5 carbon atoms, (2) an amine of the formula $$H_2N\text{---aryl}$$

where aryl denotes a hydrocarbon benzenoid radical linked to the nitrogen through nuclear carbon, free of olefinic and acetylenic unsaturation, and containing from 6 to 12 carbon atoms, to obtain an arylammonium phosphonate of the formula $$HO\overset{\overset{O}{\uparrow}}{P}\overset{-}{O}\overset{+}{N}\text{-aryl}$$
$$\phantom{HOP}H\phantom{O}H_3$$

where aryl is as defined above.

4. The method defined in claim 3, further limited in that aryl is phenyl.

5. The method defined in claim 3, further limited in that R is ethyl.

6. The method defined in claim 3, further limited in that R is ethyl and aryl is phenyl.

No references cited.

CHARLES B. PARKER, *Primary Examiner.*

P. C. IVES, *Assistant Examiner.*